United States Patent
Ahn et al.

(10) Patent No.: US 12,524,468 B2
(45) Date of Patent: Jan. 13, 2026

(54) SHORTEST PATH SEARCH IN OBSTACLE ENVIRONMENT

(71) Applicant: POSTECH Research and Business Development Foundation, Pohang-si (KR)

(72) Inventors: Hee Kap Ahn, Pohang-si (KR); Hyo Jeong An, Pohang-si (KR); Mook Kwon Jung, Pohang-si (KR); Tae Kang Eom, Pohang-si (KR); Hwi Kim, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 203 days.

(21) Appl. No.: 18/494,671

(22) Filed: Oct. 25, 2023

(65) Prior Publication Data
US 2025/0103653 A1 Mar. 27, 2025

(30) Foreign Application Priority Data
Sep. 25, 2023 (KR) .......................... 10-2023-0127659

(51) Int. Cl.
*G06F 16/901* (2019.01)
(52) U.S. Cl.
CPC ................. *G06F 16/9024* (2019.01)
(58) Field of Classification Search
CPC .................................................. G06F 16/9024
See application file for complete search history.

(56) References Cited

U.S. PATENT DOCUMENTS

| 12,026,637 B1 * | 7/2024 | Demiroz | ............ G06F 16/9024 |
| 2021/0192371 A1 * | 6/2021 | Tago | ....................... G06N 20/00 |

FOREIGN PATENT DOCUMENTS

| JP | 2020-057313 A | 4/2020 |
| KR | 10-2022-0074811 A | 6/2022 |
| KR | 10-2022-0084997 A | 6/2022 |
| KR | 20220074811 A | 6/2022 |

(Continued)

OTHER PUBLICATIONS

"What is an epsilon graph" google query, date Aug. 5, 2025. (Year: 2025).*

(Continued)

*Primary Examiner* — Calvin Cheung
(74) *Attorney, Agent, or Firm* — Morgan, Lewis & Bockius LLP (57) ABSTRACT

Disclosed are embodiments of shortest path search in an obstacle environment. Provided is a shortest path search method including: creating an epsilon graph; and determining k closest points from a query point on the basis of the graph, wherein the creating of the graph includes: creating a node group of nodes on the basis of a point group of arrival points; creating an edge group of edges on the basis of the created nodes; setting, on the basis of an obstacle group of at least one obstacle, whether each of the nodes is a valid node or a non-valid node; setting, on the basis of the obstacle group, whether each of the edges is a valid or non-valid edge; and including, for each of the arrival points, a particular arrival point on an anchor list of a valid node closest from the particular arrival point among the valid nodes.

20 Claims, 7 Drawing Sheets

(56) References Cited

FOREIGN PATENT DOCUMENTS

KR　　　20220084997 A　　6/2022

OTHER PUBLICATIONS

CN-113468293-B with English translation; date filed Jul. 13, 2017; date published Jun. 13, 2023. (Year: 2023).*
CN-113776539-B with English translation; date filed Sep. 28, 2021; date published Dec. 10, 2021. (Year: 2021).*
WO-2022145552A1 with English translation; date filed Dec. 29, 2020; date published Jul. 7, 2022. (Year: 2022).*

* cited by examiner

SHORTEST PATH SEARCH IN OBSTACLE ENVIRONMENT

CROSS REFERENCE TO RELATED APPLICATION

The present application claims priority to Korean Patent Application No. 10-2023-0127659, filed Sep. 25, 2023, the entire contents of which is incorporated herein for all purposes by this reference.

BACKGROUND OF THE INVENTION

Field of the Invention

The present disclosure relates to a shortest path search technology. More particularly, some embodiments relate to searching for the shortest path approximately in a 3D obstacle environment. Some embodiments relate to searching for k closest points when a position of a drone is given.

Description of the Related Art

A drone path setting issue is searching for the closest arrival point when several arrival points are given, and is used in a drone delivery industry. The height of buildings is limited, so it can be assumed that there are no obstacles once a drone goes to or above a particular point. However, going to or above the particular point may cause durability problems of the drone, and may also pose difficulties in communicating with other devices. Therefore, the drone path setting issue is considerably important in an environment where there are obstacles.

An algorithm for searching for k closest points from the position of a drone when obstacles and several arrival points are given in a 3D space is known as NP-hard. Therefore, when a predetermined number of obstacles or more and several arrival points are given, obtaining an accurate answer may take a long time.

Furthermore, in real environments, an arrival point position of a drone may change in real time as an obstacle environment changes, such as building construction and demolition. Restarting the algorithm from the beginning each time various environmental changes occur may be inefficient.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, there is a need of a technology for finding the shortest path in a 3D obstacle environment, a heuristic approximation algorithm for obtaining k closest arrival points in a 3D environment in which obstacles and arrival points are given, and/or a data structure that allows k shortest distance points to be obtained with less additional operation even when obstacles and arrival points are added or deleted.

According to an aspect of the present disclosure, there is provided a shortest path search method including: creating an epsilon graph; and determining k closest points from a query point on the basis of the epsilon graph.

In some embodiments, the creating of the epsilon graph may include: creating a node group of a plurality of nodes on the basis of a point group of a plurality of arrival points; creating an edge group of a plurality of edges on the basis of the created nodes; setting, on the basis of an obstacle group of at least one obstacle, whether each of the plurality of nodes is a valid node or a non-valid node; setting, on the basis of the obstacle group, whether each of the plurality of edges is a valid edge or a non-valid edge; and including, for each of the arrival points, a particular arrival point among the arrival points on an anchor list of a valid node closest from the particular arrival point among the valid nodes.

In some embodiments, the method may further include updating the epsilon graph, and the determining may include determining k closest points from the query point on the basis of the updated epsilon graph.

In some embodiments, the determining may include determining the k closest points from the query point using a graph-based shortest path algorithm.

According to another aspect of the present disclosure, there is provided a non-transitory recording medium storing therein instructions readable by a processor of an electronic device, wherein the instructions enable the processor to perform embodiments of the present disclosure.

According to another aspect of the present disclosure, there is provided an electronic device including: at least one processor; and a memory, wherein the memory is configured to store therein instructions that enable the at least one processor to execute: an operation of creating an epsilon graph; and an operation of determining k closest points from a query point on the basis of the epsilon graph.

In some embodiments, the operation of creating the epsilon graph may include: a sub-operation of creating a node group of a plurality of nodes on the basis of a point group of a plurality of arrival points; a sub-operation of creating an edge group of a plurality of edges on the basis of the created nodes; a sub-operation of setting, on the basis of an obstacle group of at least one obstacle, whether each of the plurality of nodes is a valid node or a non-valid node; a sub-operation of setting, on the basis of the obstacle group, whether each of the plurality of edges is a valid edge or a non-valid edge; and a sub-operation of including, for each of the arrival points, a particular arrival point among the arrival points on an anchor list of a valid node closest from the particular arrival point among the valid nodes.

In some embodiments, the memory may further store therein an instruction that enables the at least one processor to execute an operation of updating the epsilon graph, and the operation of determining may include an operation of determining k closest points from the query point on the basis of the updated epsilon graph.

In some embodiments, the electronic device may further include a flight module for enabling the electronic device to move in the sky, wherein the memory may be configured to further store therein an instruction that enables the at least one processor to execute an operation of controlling the flight module such that the electronic device moves to a position of at least one of the determined k closest points.

This summary is provided to introduce selections in a simplified form from concepts that are further described in the following detailed description. This summary is not intended to identify key features or essential features of the claimed subject matter, nor is it intended to be used to limit the scope of the claimed subject matter. In addition, the claimed subject matter is not limited to implementations that solve any or all problems noted in any part of this disclosure. In addition to the exemplary aspects, embodiments, and features described above, additional aspects, embodiments, and features will become apparent with reference to the following detailed description and drawings.

Some embodiments of the present disclosure may have effects including the following advantages. However, since this does not mean that all embodiments must include all of the effects, the scope of the present disclosure should not be understood as being limited thereby.

According to some embodiments, setting a drone path in a 3D obstacle environment can be performed in a shorter time than conventional methods. For example, according to existing knowledge, setting a drone path in a 3D obstacle environment is NP-hard, and the conventional method takes time exponentially in proportion to the number of given obstacles to obtain an accurate answer. However, according to some embodiments of the present disclosure, an answer approximate to an accurate answer can be obtained within polynomial time proportional to the number of obstacles.

According to some embodiments, with rapid adaption to an environment that changes in real time due to addition or deletion of obstacles and points, various issues (for example, drone path setting issue, and other optimization issues) can be solved.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

A description of the present disclosure is merely an embodiment for a structural or functional description. The scope of the present disclosure should not be construed as being limited to embodiments described in the context. That is, the embodiments may be modified in various forms, and the scope of the present disclosure should be construed as including equivalents which may realize the technical idea. In addition, objectives or effects proposed in the present disclosure do not mean that a specific embodiment must include all or only the objectives or effects, and thus the scope of the present disclosure should not be understood to be restricted thereby.

In the meantime, the meaning of terms described in this disclosure should be understood as follows.

The terms, such as "first" and "second", are used to distinguish one element from the other element, and the scope of the present disclosure should not be restricted by the terms. For example, a first element may be named a second element. Likewise, a second element may be named a first element.

It will be understood that when an element is referred to as being "coupled" to another element, it can be directly coupled to the other element or intervening elements may be present therebetween. In contrast, it should be understood that when an element is referred to as being "directly coupled" to another element, there are no intervening elements present. In the meantime, the same principle applies to other expressions, such as "between ~" and "just between ~" or "adjacent to ~" and "adjacent just to ~", which describe a relation between elements.

An expression used in the singular encompasses the expression of the plural, unless the context clearly means otherwise. It will be furthermore understood that the terms such as "including", "having", etc. are intended to indicate the existence of the features, numbers, steps, operations, elements, components, or combinations thereof disclosed in the specification, and are not intended to preclude the possibility that one or more other features, numbers, steps, operations, elements, components, or combinations thereof may exist or may be added.

In each of steps, symbols (e.g., a, b, and c) are used for convenience of a description, and the symbols do not describe order of the steps. The steps may be performed in order different from order described in the context unless specific order is clearly described in the context. In other words, the steps may be performed in the same order as described, may be performed substantially simultaneously, or may be performed in the reverse order.

Figure 1:
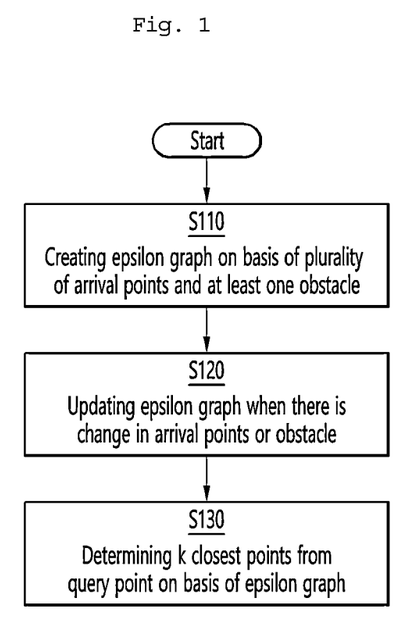
FIG. 1 is a flowchart illustrating shortest path search according to some embodiments of the present disclosure.

FIG. 1 is a flowchart illustrating shortest path search according to some embodiments of the present disclosure.

Figure 7:
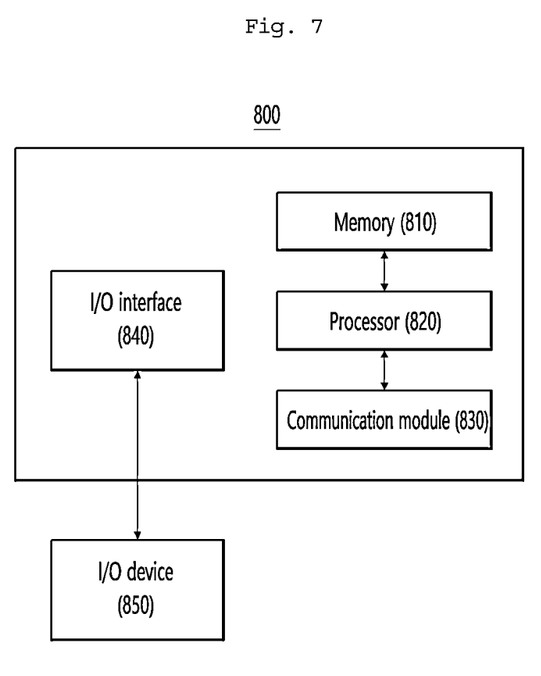
FIG. 7 is a block diagram illustrating an electronic device that performs a method according to embodiments of the present disclosure.

In some embodiments, shortest path search of FIG. 1 may be performed by an electronic device (for example, an electronic device of FIG. 7). In some embodiments, the electronic device may be a computer. In some embodiments, the electronic device may be a flying device (for example, a drone) or a traveling device (for example, a vehicle) that can move its position by flying or traveling.

Hereinafter, some embodiments of the present disclosure will be described assuming that the shortest path search of FIG. 1 is performed by an electronic device.

According to some embodiments, a shortest path search method may include as shown in FIG. 1: creating an epsilon graph in step S110; updating the epsilon graph in step S120; and determining k closest points from a query point on the basis of the current epsilon graph in step S130. In this case, the electronic device may determine the k closest points from the query point on the basis of the updated epsilon graph in step S130.

According to some other embodiments, a shortest path search method may omit the step S120 of updating the epsilon graph. In this case, the electronic device may determine k closest points from a query point on the basis of the created epsilon graph in step S130.

In some embodiments, an assumption that given obstacles do not intersect or that arrival points are not in the obstacles may be used in step S110.

In some embodiments, whether to add arrival points may be determined by checking whether the arrival points to be added are positioned in other obstacles in step S120. In some embodiments, whether to add an obstacle may be determined by checking whether the obstacle intersects existing obstacles. In some embodiments, when an obstacle is added (deleted), edges that intersect (intersected) the obstacle are deleted (connected) and the epsilon graph may be changed.

In some embodiments, a shortest distance algorithm may be used on the basis of the given epsilon graph in step S130.

In some embodiments, the electronic device may create an epsilon graph using Pseudocode 1 below in step S110.

```
<Pseudocode 1>

Algorithm constructEpsilonGraph(eps, T , P )
    Input: spacing eps between grid points, group T of points, and group P of 3D polyhedra.
    Output: graph EG (V, E, T, P) constructed on the basis of eps, T, and P.
 1: Assume that any two polyhedra of P do not intersect, and any point of T is not included in any polyhedron of P.
 2: Define a group of nodes of EG as V and a group of edges as E.
 3: for t ∈ T
 4:    x_min = min{x_min, t_s}, y_min = min {y_min, t_y}, z_min = min {z_min, t_z}
 5:    x_max = min {x_max, t_s}, y_max = max {y_max, t_y}, z_max = max {z_max, t_z}
 6: end for
 7: x_ind = (x_max-x_min)/eps, y_ind = (y_max-y_min)/eps, z_ind = (z_max-z_min)/eps
 8: for 0 ≤ j ≤ x_min 0 ≤ k ≤ y_ind 0 ≤ l ≤ z_ind
 9:    v = (x_min + x_ind * eps, y_min + y_ind * eps, z_min + z_ind * eps)
10:    v.exist=True
11:    V ← V ∪ /v/
12: end for
13: for v ∈ V
14:    if obstacle p including v exists then
15:       add v to list p.delpoint
16:       v.exist=False
17:    end if
18: end for
19: for v_1, v_2 ∈ V satisfying |v_1 − v_2| = eps
20:    e ← (v_1, v_2)
21:    if obstacle p intersecting e exists then
22:       add p to list e.crosspol
23:       add e to list p.deledge
24:       e.exist= False
25:    else
26:       e.exist= True
27:    end if
28:    E ← E ∪ {e}
29: end for
30: for t ∈ T
31:    v ← the node closest to t
32:    v.anchor ← v.anchor ∪ {t}
33: end for
34: EG ← EG(V, E, I, P )
35: return EG
```

In some embodiments, k closest arrival points on the graph may be calculated and output.

Figure 2:
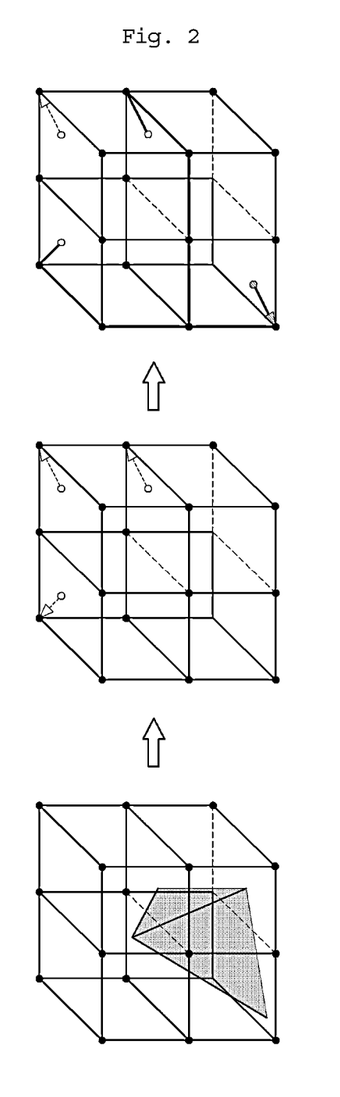
FIG. 2 is a diagram illustrating an epsilon graph according to some embodiments of the present disclosure.

FIG. 2 is a diagram illustrating an epsilon graph according to some embodiments of the present disclosure.

In the leftmost drawing of FIG. 2, the gray-shaded polyhedron may correspond to an obstacle, dots may correspond to nodes (or grid points), and lines connecting the dots may correspond to edges. In the leftmost drawing of FIG. 2, an edge intersecting the obstacle may be deleted (or may be set as a non-valid edge), and a node included in the obstacle may be deleted (or may be set as a non-valid node). For example, deleted edges may correspond to dotted lines in the middle drawing of FIG. 2, and it can be seen that a part of the nodes is deleted in the middle drawing of FIG. 2.

In the middle drawing of FIG. 2, three white dots (e.g., dots with an empty circle) may correspond to arrival points, and the arrival points may be included in (or mapped to) the respective nodes closest to the respective arrival points, as shown by the dotted arrows.

In the rightmost drawing of FIG. 2, a grey dot may correspond to a query point, and the query point may be included in (or mapped to) the node closest to the query point, as shown by the bold arrow. This position may be set as a departure position of the drone.

In the rightmost drawing of FIG. 2, the remaining bold lines excluding the bold arrow may correspond to the shortest paths (for example, considering the obstacle) for reaching the k-nearest neighbors. For example, k may be 2.

Figure 3:
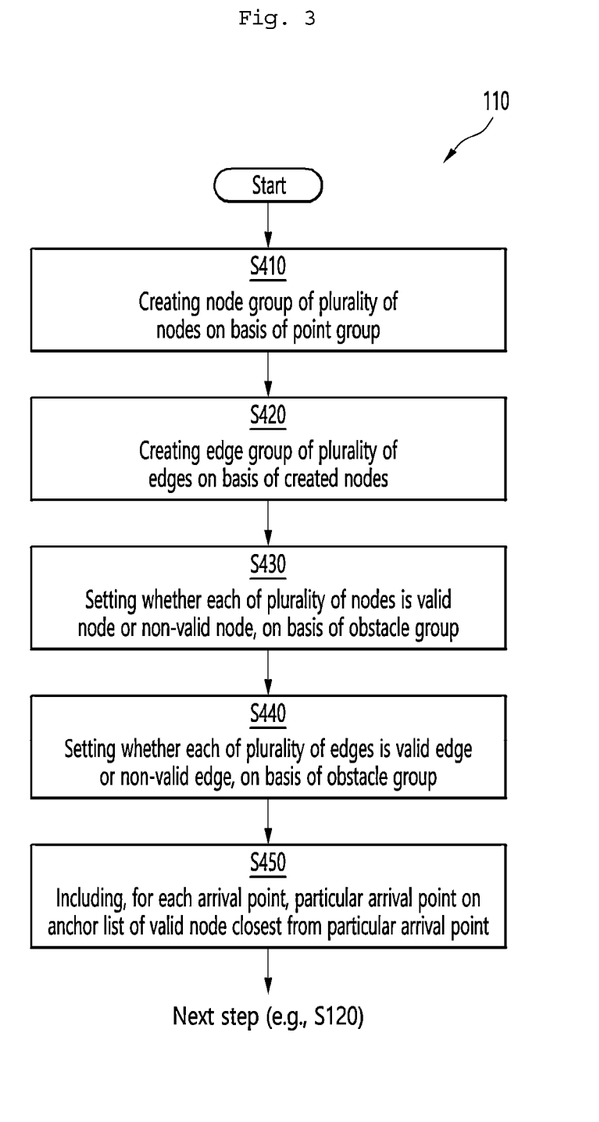
FIG. 3 is a flowchart illustrating epsilon graph creation S110 according to some embodiments of the present disclosure.

FIG. 3 is a flowchart illustrating epsilon graph creation S110 according to some embodiments of the present disclosure.

Referring to FIG. 3, in some embodiments, the electronic device may create a node group (for example, V in Pseudocode 1) including a plurality of nodes on the basis of a point group (for example, T in Pseudocode 1) including a plurality of arrival points in step S410. In some embodiments, the electronic device may set, as the plurality of nodes, a plurality of grid points created by dividing a space that is set on the basis of the arrival points. For example, the electronic device may determine an epsilon size (for example, corresponding to grid spacing, hereinafter, referred to as eps), and may use given arrival point data (or the point group T corresponding thereto) to store a coordinate size and grid point data (or the node group V corresponding thereto).

In some embodiments, the electronic device may create, on the basis of the created nodes, an edge group (for example, E in Pseudocode 1) including a plurality of edges. In some embodiments, the electronic device may set, as the plurality of edges, lines connecting two nodes having a predetermined spacing (for example, eps in Pseudocode 1) among the plurality of nodes.

In some embodiments, the electronic device may set, on the basis of an obstacle group (for example, P in Pseudocode 1) including at least one obstacle, whether each of the plurality of nodes is a valid node or a non-valid node (for example, v.exist=False in Pseudocode 1) in step S430.

Figure 4:
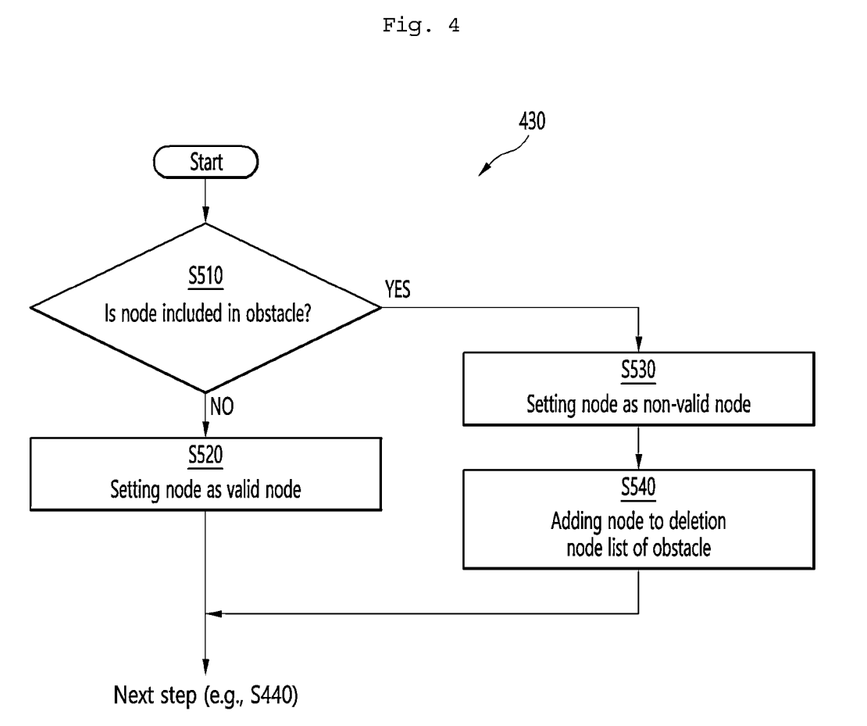
FIG. 4 is a flowchart illustrating valid node setting S430 according to some embodiments of the present disclosure.

FIG. 4 is a flowchart illustrating valid node setting S430 according to some embodiments of the present disclosure.

Referring to FIG. 4, in some embodiments, the electronic device may determine whether each of the set plurality of nodes is included in at least one of the at least one obstacle (for example, whether a grid point is in an obstacle) in step S510.

In some embodiments, when determining that a node is included in at least one of the at least one obstacle in step S510, the electronic device may set the node as a non-valid node in step S530, and may add the node to a deletion node list (for example, p.delpoint list in Pseudocode 1) of the corresponding obstacle in step S540.

In some embodiments, when it is determined that a node is not included in any one of the at least one obstacle in step S510, the node may be set as a valid node in step S520.

Referring back to FIG. 3, in some embodiments, the electronic device may set, on the basis of the obstacle group, whether each of the plurality of edges is a valid edge or a non-valid edge (for example, e.exist=False in Pseudocode 1) in step S440.

Figure 5:
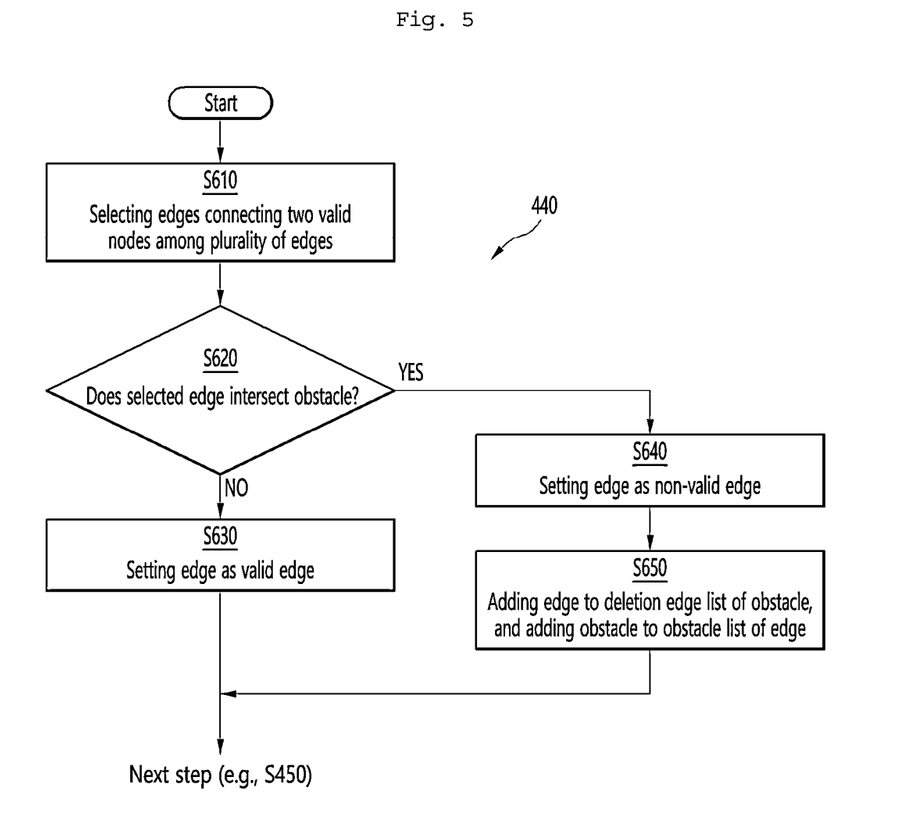
FIG. 5 is a flowchart illustrating valid edge setting S440 according to some embodiments of the present disclosure.

FIG. 5 is a flowchart illustrating valid edge setting S440 according to some embodiments of the present disclosure.

Referring to FIG. 5, in some embodiments, the electronic device may select edges connecting two valid nodes among the plurality of edges in step S610.

In some embodiments, the electronic device may determine whether each of the selected edges intersects at least one of the at least one obstacle in step S620.

In some embodiments, when determining that an edge intersects at least one of the at least one obstacle in step S620, the electronic device may set the edge as a non-valid edge in step S640, may add the edge to a deletion edge list (for example, p.deledge in Pseudocode 1) of the corresponding obstacle, and may add the corresponding obstacle to an intersection obstacle list (for example, e.crosspol in Pseudocode 1) of the edge in step S650.

In some embodiments, when it is determined that an edge does not intersect any one of the at least one obstacle in step S620, the electronic device may set the edge as a valid edge in step S630.

Referring back to FIG. 3, in some embodiments, the electronic device may include, for each of the arrival points, an arrival point on an anchor list (for example, v.anchor in Pseudocode 1) of a valid node closest from the arrival point among the valid nodes in step S450.

In some embodiments, the updating S120 of the epsilon graph may be caused by changes in the arrival points (for example, deletion or addition) or changes in the obstacles (for example, deletion or addition).

When an additional candidate obstacle occurs, in some embodiments, the electronic device may update the epsilon graph using Pseudocode 2 below.

<Pseudocode 2>

Algorithm AddPolytope(EG, p)
  Input: graph EG and polyhedron p to be added.
  Output: changed graph EG(V, E, T, P ).
1: EG is composed of group V of nodes, group E of edges, group T of points, and group P of obstacles.
2: for t ∈ T, h ∈ P
3:     if t ∈ p or h ∩ p ≠ ∅ then
4:         return EG
5:     end if
6: end for
7: for v ∈ V -continued <Pseudocode 2>

8:     if v ∈ p then
9:         add v to list p.delpoint
10:        V ← V\{v}
11:    end if
12: end for
13: for e ∈ E
14:    if ∩ p ≠ ∅ then
15:        add p to list e.crosspol
16:        add e to list p.deledge
17:        e.exist= False
18:    end if
19: end for
20: P ← P ∪ {p}
21: EG ← EG(V, E, T, P )
22: return EG In some embodiments, when an additional candidate obstacle occurs, the electronic device may add the additional candidate obstacle (for example, p in Pseudocode 2) satisfying predetermined conditions to the obstacle group (for example, P in Pseudocode 2). In some embodiments, the predetermined conditions may include a condition in which the additional candidate obstacle does not include any one of the arrival points, and a condition in which the additional candidate obstacle does not overlap with any one of the obstacles. In some embodiments, when an additional candidate obstacle intersects an existing obstacle (for example, an obstacle currently included in the obstacle group) or includes an existing arrival point (for example, an arrival point currently included in the point group), the electronic device may stop the execution of adding the obstacle.

In some embodiments, when the plurality of nodes involve a valid node included in the added obstacle, the electronic device may set the node as a non-valid node and may add the node to a deletion node list (for example, p.delpoint list in Pseudocode 2) of the added obstacle.

In some embodiments, when the plurality of edges involve a valid edge intersecting the added obstacle, the electronic device may set the edge as a non-valid edge (for example, e.exist=False in Pseudocode 2), may add the obstacle to an intersection obstacle list (for example, e.crosspol list in Pseudocode 2) of the edge, and may add the edge to a deletion edge list (for example, p.deledge list in Pseudocode 2) of the obstacle.

When an additional candidate arrival point occurs, in some embodiments, the electronic device may update the epsilon graph using Pseudocode 3 below.

<Pseudocode 3>

Algorithm AddPoint(EG, t)
  Input: graph EG and point t to be added.
  Output: changed graph EG (V, E, T, P).
1: EG is composed of group V of nodes, group E of edges, group T of points, and group P of obstacles
2: for p ∈ P
3:     if t ∈ p then
4:         return EG
5:     end if
6: end for
7: T ← T ∪ {t}
8: v ← the node closest to t
9: v.anchor ← v.anchor ∪ {t}
10: EG ← EG(V, E, T, P )
11: return EG In some embodiments, when an additional candidate arrival point occurs, the electronic device may add the additional candidate arrival point (for example, t in Pseudocode 3) satisfying a predetermined condition to the arrival point group (for example, T in Pseudocode 3). In some embodiments, the predetermined condition may include a condition in which the additional candidate arrival point is not included in any one of the at least one obstacle. In some embodiments, when an additional candidate arrival point is included in an existing obstacle, the electronic device may stop the execution of adding the arrival point.

In some embodiments, when an additional candidate arrival point is added to the arrival point group, the electronic device may add the added arrival point to an anchor list (for example, v.anchor in Pseudocode 3) of a valid node closest from the added arrival point among the plurality of nodes.

When a deletion candidate obstacle occurs, in some embodiments, the electronic device may update the epsilon graph using Pseudocode 4 below.

<Pseudocode 4>

Algorithm DelPolytope(EG, p)
  Input: graph EG and polyhedron p to be deleted.
  Output: changed graph EG (V, E, T, P).
1: EG is composed of group V of nodes, group E of edges, group T of points, and group P of obstacles.
2: delete obstacle corresponding to p from group P
3: save exist(existence) of all nodes in p.delpoint as True
4: for e ∈ p.deledge
5:     delete p from list e.crosspol
6:         if e.crosspol is an empty list then
7:             e.exist = True
8:     end if
9: end for
10: EG ← EG(V, E, T, P )
11: return EG In some embodiments, when a deletion candidate obstacle occurs, the electronic device may delete the deletion candidate obstacle from the obstacle group.

In some embodiments, the electronic device may use a deletion node list and a deletion edge list of the deleted obstacle to restore deleted edges and node.

In some embodiments, when at least one node is included in the deletion node list (for example, p.delpoint in Pseudocode 4) of the deleted obstacle, the electronic device may set the node as a valid node in the node group.

In some embodiments, when at least one edge is included in the deletion edge list (for example, p.deledge in Pseudocode 4) of the deleted obstacle, the electronic device may delete the deleted obstacle from an intersection obstacle list (for example, e.crosspol list in Pseudocode 4) of the edge.

In some embodiments, when the intersection obstacle list (for example, e.crosspol list of Pseudocode 4) of the edge is empty as a result of deleting the deleted obstacle, the electronic device may set the edge as a valid edge.

When a deletion candidate arrival point occurs, in some embodiments, the electronic device may update the epsilon graph using Pseudocode 5 below.

<Pseudocode 5>

Algorithm DelPoint(EG, 1)
  Input: graph EG and point t to be deleted.
  Output: changed graph EG (V, E, T, P).
1: EG is composed of group V of nodes, group E of edges, group T -continued <Pseudocode 5> of points, and group P of obstacles.
2: delete point corresponding to t from group T
3: for v ∈ V
4:     if t ∈ v.anchor then
5:         delete t from list v.anchor
6:     end if
7: end for
8: EG ← EG(V, E, T, P )
9: return EG In some embodiments, when a deletion candidate arrival point occurs, the electronic device may delete the deletion candidate arrival point from the point group.

In some embodiments, for a node having an anchor list including the deletion candidate arrival point, the deletion candidate arrival point may be deleted from the anchor list (for example, v.anchor list in Pseudocode 5) of the node.

In some embodiments, the determining S130 of the k-nearest neighbors may be performed using a graph-based shortest path algorithm (for example, Dijkstra algorithm). For example, using the graph-based shortest path algorithm, the electronic device may determine k closest points from a query point.

Figure 6:
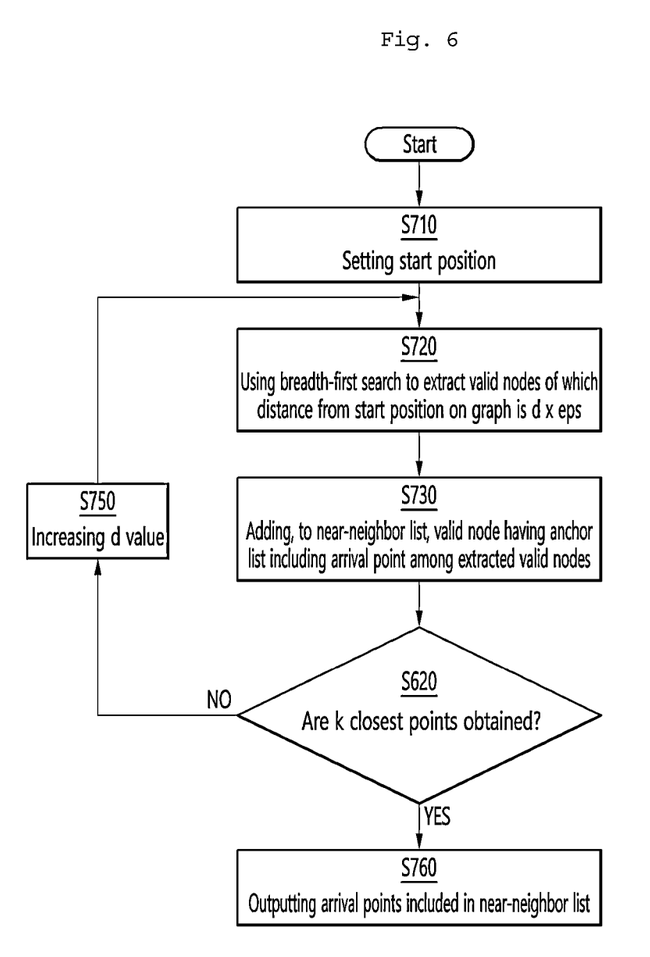
FIG. 6 is a flowchart illustrating some embodiments of k-nearest neighbors determination according to the present disclosure.

FIG. 6 is a flowchart illustrating some embodiments of k-nearest neighbors determination according to the present disclosure.

Referring to FIG. 6, in some embodiments, the electronic device may set, as a start position, a valid node closest from the query point among the nodes currently included in the node group in step S710.

In some embodiments, the electronic device may use breadth-first search to extract, from the node group, at least one valid node of which a distance from the set start position on the graph is a predetermined distance (for example, d×eps, herein, d is a natural number and may be set starting from 1) in step S720.

In some embodiments, when an anchor list of the extracted at least one valid node includes at least one of the arrival points, the electronic device may include the valid node to a near-neighbor list in step S730. The valid nodes included in the near-neighbor list may be arranged in ascending order of distance from the set start position.

In some embodiments, the electronic device may determine whether k closest points from the query point are all obtained at the current point in time in step S740.

In some embodiments, when determining that k closest points are not all obtained in step S740, the electronic device may increase the distance (for example, the value of d) on the graph in step S750, may return to step S720, and may repeat steps S720, S730, and S740.

In some embodiments, when it is determined that k closest points are all obtained in step S740 or that all the grid points are searched, the electronic device may output the arrival points included in the near-neighbor list in step S760.

Tables 1 and 2 show error rates when tests were conducted in virtual environments. More specifically, Table 1 shows error rates between the sums of lengths of paths derived using the algorithm and the sums of lengths of actual paths, and Table 2 shows error rates in difference between arrival points derived using the algorithm and actual arrival points.

TABLE 1

| Classification | Test result | | | |
|---|---|---|---|---|
| Test data | 100 pieces (50 pieces of uniform data and 50 pieces of cluster data) | | | |
| | Uniform data | | Cluster data | |
| | k | Error rate (%) | k | Error rate (%) |
| | 10 | 31.498 | 10 | 32.884 |
| | 50 | 26.004 | 50 | 26.297 |
| | 100 | 25.504 | 100 | 23.769 |
| | 500 | 17.770 | 500 | 17.960 |
| | 1,000 | 15.127 | 1,000 | 15.146 |
| | Average | 23.181 | Average | 23.211 |

TABLE 2

| Classification | Test result | | | |
|---|---|---|---|---|
| Test data | 100 pieces (50 pieces of uniform data and 50 pieces of cluster data) | | | |
| | Uniform data | | Cluster data | |
| | k | Error rate (%) | k | Error rate (%) |
| | 10 | 36.125 | 10 | 33.566 |
| | 50 | 26.153 | 50 | 24.762 |
| | 100 | 17.743 | 100 | 20.509 |
| | 500 | 12.977 | 500 | 12.415 |
| | 1,000 | 9.686 | 1,000 | 9.614 |
| | Average | 19.937 | Average | 20.173 |

As a test environment, 10,000 arrival points and 10 obstacles were given and a drone position was queried 1000 times. The uniform data corresponds to an environment in which arrival points are spread evenly across the entire area, and the cluster data corresponds to an environment in which pieces of data are gathered around particular points.

The test results show that the error rate was 19% to 23% on average, and the larger the k value, the smaller the error rate. Considering actual commercial use, delivery to many arrival points will be performed, so the fact that the error rate decreases is positive.

In some embodiments, the electronic device of the present disclosure may include at least, one processor and a memory.

In some embodiments, the memory may store therein instructions that enable the at least one processor to execute: an operation of creating an epsilon graph; and an operation of determining k closest points from a query point on the basis of the epsilon graph.

In some embodiments, the operation of creating the epsilon graph may include: a sub-operation of creating a node group of a plurality of nodes on the basis of a point group of a plurality of arrival points; a sub-operation of creating an edge group of a plurality of edges on the basis of the created nodes; a sub-operation of setting, on the basis of an obstacle group of at least one obstacle, whether each of the plurality of nodes is a valid node or a non-valid node; a sub-operation of setting, on the basis of the obstacle group, whether each of the plurality of edges is a valid edge or a non-valid edge; and a sub-operation of including, for each of the arrival points, a particular arrival point among the arrival points on an anchor list of a valid node closest from the particular arrival point among the valid nodes.

In some embodiments, the memory may further store therein an instruction that enables the at least one processor to execute an operation of updating the epsilon graph, and the operation of determining may include an operation of determining k closest points from the query point on the basis of the updated epsilon graph.

In some embodiments, the electronic device may further include a flight module that enables the electronic device to move in the sky. In some embodiments, the memory may further store therein an instruction that enables the at least one processor to execute an operation of controlling the flight module such that the electronic device moves to a position of at least one of the determined k closest points.

FIG. 7 is a block diagram illustrating an electronic device that performs a method according to embodiments of the present disclosure. In FIG. 7, an electronic device 800 is described as a single physical device. However, depending on an embodiment, the electronic device 800 may be realized in a form (for example, distributed computing) in which a plurality of devices are linked.

In some embodiments, the electronic device 800 may include a memory 810 and a processor 820 as shown in FIG. 5. In some other embodiments, the electronic device 800 may further include all or part of a group of a communication module 830, an input/output interface 840, and other units (for example, the flight module or the traveling module described above).

The memory 810 is a recording medium that is readable by the electronic device (for example, a computer), and may include a random-access memory (RAM), a read-only memory (ROM), and a permanent mass storage device such as a disk drive. Herein, the ROM and the permanent mass storage device may be separated from the memory 810 and may be included as separate permanent storage devices. In addition, the memory 810 may store an operating system and at least one program code (for example, a program such as a computer program that is stored in the recording medium included in the electronic device 800 to control the electronic device 800 in order to perform a method according to embodiments of the present disclosure) therein. Such software components may be loaded from an electronic device-readable recording medium separate from the memory 810. The separate electronic device-readable recording medium may include an electronic device-readable recording medium, such as a floppy drive, a disk, a tape, a DVD/CD-ROM drive, and a memory card. In another embodiment, the software components may be loaded in the memory 810 through the communication module 830 rather than an electronic device-readable recording medium.

The processor 820 may be configured to process instructions of a program, such as a computer program, by performing basic arithmetic, logic, and input/output operations. The instructions may be provided to the processor 820 by the memory 810 or the communication module 830. For example, the processor 820 may be configured to execute instructions received according to a program code loaded in the memory 810. As a more specific example, the processor 820 may perform shortest path search according to an embodiment of the present disclosure by sequentially executing instructions according to a code of a computer program loaded in the memory 810. The communication module 830 may provide a function for communicating with other physical devices through a communication network such as a computer network. For example, an embodiment of the present disclosure may be performed in a manner that the processor 820 of the electronic device 800 performs part of a process of the present embodiment and another physical device (for example, an electronic device such as another computer not shown) of the communication network performs the remaining process and a result of processing is exchanged through the communication network and the communication module 830.

The input/output interface 840 may be a means for interfacing with an input/output device 850. For example, in the input/output device 850, an input device may include a device, such as a keyboard or a mouse, and an output device may include a device, such as a display or a speaker. In FIG. 7, the input/output device 850 is expressed as a separate device from the electronic device 800, but depending on an embodiment, the electronic device 800 may be realized such that the input/output device 850 is included in the electronic device 800.

The devices described above may be realized using hardware components, software components, and/or combinations of hardware components and software components. For example, the devices and the elements described in the embodiments may be realized using at least one general-purpose computer or special-purpose computer, such as a processor, a controller, an arithmetic logic unit (ALU), a digital signal processor, a microcomputer, a field-programmable gate array (FPGA), a programmable logic unit (PLU), a microprocessor, or any other device capable of executing instructions and responding. The electronic device 800 may run an operating system (OS) and at least one software application that runs on the operating system. In addition, the electronic device 800 may also access, store, manipulate, process, and create data in response to execution of the software. For convenience of understanding, a description is given assuming that a single electronic device 800 is used, but those skilled in the art will understand that the electronic device 800 may include a plurality of processing elements and/or a plurality of types of processing elements. For example, the electronic device 800 may include a plurality of processors or one processor, and one controller. In addition, other processing configurations such as parallel processors are possible.

Software may include a computer program, a code, an instruction, or at least one combination thereof, and may configure the electronic device 800 to operate as desired or may command the electronic device 800 independently or collectively. Software and/or data may be embodied in a particular type of machine, component, physical device, computer storage medium or device in order to be interpreted by the electronic device 800 or to provide instructions or data to the electronic device 800. The software may be distributed over networked computer systems, so that the software may be stored or executed in a distributed manner. The software and data may be stored on one or more computer-readable recording media.

A method according to an embodiment may be realized in the form of program instructions executable by various computer means and may be recorded on a computer-readable recording medium. Herein, the medium may keep storing a computer-executable program, or may temporarily store the program for execution or download. In addition, the medium may be a variety of recording or storage means in the form of a single piece of hardware or a combination of several pieces of hardware. The medium may exist in a distributed manner over a network, without being limited to a medium directly connected to a particular computer system. Examples of the medium include a magnetic recording medium such as a hard disk, a floppy disk, and a magnetic tape; an optical recording medium such as a CD-ROM and a DVD; a magneto-optical medium such as a floptical disk; and hardware devices that are configured to store program instructions, such as a ROM, a RAM, and a flash memory. In addition, other examples of the medium include a recording medium and a storage medium managed by an app store that distributes applications or by a site or server that supplies or distributes other various types of software.

Although the embodiments have been described with the limited embodiments and drawings, various modification and alterations from the above description may be made by those skilled in the art. For example, suitable results may be achieved if the described techniques are performed in a different order and/or if components in a described system, architecture, device, or circuit are combined in a different manner and/or replaced or supplemented by other components or their equivalents.

Accordingly, other implementations, other embodiments, and equivalents of the claims are also fall within the scope of the following claims.

What is claimed is:

1. A method for controlling a moveable electronic device, comprising:
at the moveable electronic device, wherein the moveable electronic device includes one or more processors and memory, and is disposed in an environment including an obstacle group having at least one obstacle:
obtaining information of a departure position and an arrival point group of the moveable electronic device, the arrival point group including a plurality of arrival points;
creating an epsilon graph of the environment, the epsilon graph including an anchor list having a set of valid positions and a set of valid device paths connecting the set of valid device positions;
determining, based on the epsilon graph, a plurality of target points that are closest to the departure position of the moveable electronic device among the set of valid positions;
setting a moving path based on the plurality of target points; and
controlling the moveable electronic device to move from the departure position to the plurality of arrival points based on the moving path;
wherein the creating of the epsilon graph further comprises:
creating a node group of a plurality of device positions based on the plurality of arrival points;
creating an edge group of a plurality of device paths based on the plurality of device positions;
based on a location of the at least one obstacle, determining whether each of the plurality of device positions is a valid position or a non-valid position for the moving electronic device;
based on the location of at least one obstacle, determining whether each of the plurality of device paths is a valid device path or a non-valid device path; and
including, for each of the arrival points, a particular arrival point among the arrival points on the anchor list of valid device position closest from the particular arrival point among one or more valid device positions determined among the plurality of device positions.

2. The method of claim 1, wherein the creating of the node group comprises setting, as the plurality of device positions, a plurality of grid points created by dividing a space set based on the arrival points, and
determining whether each of the plurality of device positions is a valid device position or a non-valid device position comprises:

determining whether each of the plurality of device positions is included in at least one of the at least one obstacle; and setting, when it is determined that a particular device position among the device positions is included in at least one of the at least one obstacle, the particular device position as a non-valid device position, and adding the particular device position to a deletion node list of the at least one obstacle including the particular device position; or setting, when it is determined that a particular device position among the plurality of device positions is not included in any one of the at least one obstacle, the particular device position as a valid device position.

3. The method of claim 1, wherein the creating of the edge group comprises setting, as the plurality of device paths, lines connecting two device positions having a predetermined spacing among the plurality of device positions, and determining whether each of the plurality of device paths is a valid device path or a non-valid device path comprises:

selecting device paths connecting two valid device positions among the plurality of device paths;

determining whether each of the selected device paths intersects at least one of the at least one obstacle; and setting, when it is determined that a particular device path among the selected device paths intersects at least one of the at least one obstacle, the particular device path as a non-valid device path, and adding the particular device path to a deletion edge list of the at least one obstacle intersecting the particular device path, and adding the at least one obstacle intersecting the particular device path to an intersection obstacle list of the particular device path; or setting, when it is determined that a particular device path among the selected device paths does not intersect any one of the at least one obstacle, the particular device path as a valid device path.

4. The method of claim 1, further comprising updating the epsilon graph, wherein the determining the plurality of target points comprises determining the plurality of target points closest to the department position among the set of valid positions based on the updated epsilon graph.

5. The method of claim 4, wherein the epsilon graph is updated in response to adding, when an additional candidate obstacle occurs, the additional candidate obstacle satisfying predetermined conditions to the obstacle group.

6. The method of claim 5, wherein the predetermined conditions comprise a condition in which the additional candidate obstacle does not include any one of the arrival points, and a condition in which the additional candidate obstacle does not overlap with any one of the at least one obstacle.

7. The method of claim 5, wherein the updating comprises:

setting, when the plurality of device positions include a valid device position included in the added candidate obstacle, the device position as a non-valid device position, and adding the device position to a deletion node list of the added candidate obstacle; and setting, when the plurality of device paths include a valid device path intersecting the added candidate obstacle, the device path as a non-valid device path, and adding the added candidate obstacle to an intersection obstacle list of the device path, and adding the device path to a deletion edge list of the added candidate obstacle.

8. The method of claim 4, wherein the updating comprises:

adding, when an additional candidate arrival point occurs, the additional candidate arrival point satisfying a predetermined condition to the arrival point group; and adding the added arrival point to an anchor list of a valid device position closest from the added arrival point among the plurality of device positions.

9. The method of claim 8, wherein the predetermined condition comprises a condition in which the additional candidate arrival point is not included in any one of the at least one obstacle.

10. The method of claim 4, wherein the updating comprises:

deleting, when a deletion candidate obstacle occurs, the deletion candidate obstacle from the obstacle group;

setting, when a deletion node list of the deletion candidate obstacle includes at least one device position, the at least one device position as a valid device position in the node group; and deleting, when a deletion edge list of the deleted obstacle includes at least one device path, the deletion candidate obstacle from an intersection obstacle list of the at least one device path.

11. The method of claim 10, wherein the updating further comprises setting, when the intersection obstacle list of the at least one device path is empty after the deletion candidate obstacle is deleted, the at least one device path as a valid device path.

12. The shortest path search method of claim 1, further comprising:

deleting, when a deletion candidate arrival point occurs, the deletion candidate arrival point from the arrival point group; and deleting, for a particular device position having an anchor list including the deletion candidate arrival point, the deletion candidate arrival point from the anchor list of the particular device position.

13. The method of claim 1, wherein the determining the plurality of target points comprises determining the plurality of target points that are closest to the departure position of the electronic device using a graph-based shortest path algorithm.

14. The method of claim 13, wherein the determining comprises:

setting, as a start position in a setting step, a valid device position closest from the departure position among the device positions currently included in the node group;

extracting, from the node group by using breadth-first search in an extraction step, at least one valid device position of which a distance from the set start position on the graph is a predetermined distance;

including, in an inclusion step when an anchor list of the extracted at least one valid device position includes at least one of the arrival points, the extracted at least one valid device position on a near-neighbor list, wherein valid device positions included in the near-neighbor list are arranged in ascending order of distance from the set start position; and repeating the extraction step and the inclusion step by increasing the distance on the graph until the plurality of target points from the departure position are all obtained.

15. A non-transitory computer-readable storage medium storing therein instructions readable by a processor of a moveable electronic device, wherein the instructions enable the processor to perform:

obtaining information of a departure position and an arrival point group of the moveable electronic device, the arrival point group including a plurality of arrival points;

creating an epsilon graph of an environment where the moveable electronic device is disposed, the epsilon graph including an anchor list having a set of valid positions and a set of valid device paths connecting the set of valid device positions;

determining, based on the epsilon graph, a plurality of target points that are closest to the departure position of the moveable electronic device among the set of valid positions;

setting a moving path based on the plurality of target points; and controlling the moveable electronic device to move from the departure position to the plurality of arrival points based on the moving path;

wherein the creating of the epsilon graph further comprises:
  creating a node group of a plurality of device positions based on the plurality of arrival points;
  creating an edge group of a plurality of device paths based on the plurality of device positions;
  based on a location of at least one obstacle, determining whether each of the plurality of device positions is a valid position or a non-valid position for the moving electronic device;
  based on the location of at least one obstacle, determining whether each of the plurality of device paths is a valid device path or a non-valid device path; and
  including, for each of the arrival points, a particular arrival point among the arrival points on the anchor list of valid device position closest from the particular arrival point among one or more valid device positions determined among the plurality of device positions.

16. The non-transitory computer-readable sotrage medium of claim 15, wherein creating the node group further comprises setting, as the plurality of device positions, a plurality of grid points created by dividing a space set based on the plurality of arrival points, and each of the plurality of device positions is determined a valid device position or a non-valid device position based on whether each of the plurality of device positions is included in at least one of the at least one obstacle.

17. The non-transitory computer-readable storage medium of claim 15, wherein creating the edge group further comprises setting, as the plurality of device paths, lines connecting two device positions having a predetermined spacing among the plurality of device positions, and each of the plurality of device paths is determined a valid device path or a non-valid device path based on whether each of the plurality of device paths intersects the at least one obstacle.

18. An electronic device, comprising:
  at least one processor; and
  a memory,
  wherein the memory is configured to store therein instructions that enable the at least one processor to execute:

obtaining information of a departure position and an arrival point group of the electronic device, the arrival point group including a plurality of arrival points;

creating an epsilon graph of an environment where the electronic device is disposed, the epsilon graph including an anchor list having a set of valid positions and a set of valid device paths connecting the set of valid device positions;

determining, based on the epsilon graph, a plurality of target points that are closest to the departure position of the electronic device among the set of valid positions;

setting a moving path based on the plurality of target points; and controlling the electronic device to move from the departure position to the plurality of arrival points based on the moving path;

wherein the creating of the epsilon graph further comprises:
  creating a node group of a plurality of device positions based on the plurality of arrival points;
  creating an edge group of a plurality of device paths based on the plurality of device positions;
  based on a location of at least one obstacle, determining whether each of the plurality of device positions is a valid position or a non-valid position for the electronic device;
  based on the location of at least one obstacle, determining whether each of the plurality of device paths is a valid device path or a non-valid device path; and
  including, for each of the arrival points, a particular arrival point among the arrival points on the anchor list of valid device position closest from the particular arrival point among one or more valid device positions determined among the plurality of device positions.

19. The electronic device of claim 18, wherein the memory is configured to further store therein an instruction that enables the at least one processor to execute an operation of updating the epsilon graph, and
the operation of determining the plurality of target points comprises an operation of determining the plurality of target points closest to the department position among the set of valid positions based on the updated epsilon graph.

20. The electronic device of claim 18, further comprising a flight module for enabling the electronic device to move in the sky,
  wherein the memory is configured to store therein an instruction that enables the at least one processor to execute an operation of controlling the flight module such that the electronic device moves to a position of at least one of the plurality of target points that are closest to the departure position of the electronic device among the set of valid positions.

* * * * *